United States Patent [19]

Nagamatsu et al.

[11] Patent Number: 5,625,869
[45] Date of Patent: Apr. 29, 1997

[54] SYSTEM FOR PREVENTING UNAUTHORIZED USE OF A MICRO CELLULAR SYSTEM OPERATING IN COEXISTENCE WITH A CELLULAR SYSTEM

[75] Inventors: Jun Nagamatsu, Kawasaki; Masaki Terashima; Jun Yamada, both of Yokohama, all of Japan

[73] Assignee: Matsushita Electric Industrial Co., Ltd., Osaka, Japan

[21] Appl. No.: 218,750

[22] Filed: Mar. 25, 1994

[30] Foreign Application Priority Data

Mar. 26, 1993 [JP] Japan ................................. 5-068660

[51] Int. Cl.⁶ ................................................. H04B 7/26
[52] U.S. Cl. ........................ 455/33.1; 455/53.1; 455/62; 379/59
[58] Field of Search .......................... 455/33.1, 38.2, 455/53.1, 54.2, 56.1, 63, 127, 62, 69, 68, 34.1, 34.2; 379/59, 61, 63

[56] References Cited

U.S. PATENT DOCUMENTS

| | | | |
|---|---|---|---|
| 4,825,193 | 4/1989 | Siwiak et al. | 455/127 X |
| 5,142,691 | 8/1992 | Freeburg et al. | 455/63 X |
| 5,203,008 | 4/1993 | Yasuda et al. | 455/62 X |
| 5,239,680 | 8/1993 | Grube et al. | 455/54.2 |

Primary Examiner—Reinhard J. Eisenzopf
Assistant Examiner—Philip J. Sobutka
Attorney, Agent, or Firm—Amster, Rothstein & Ebenstein

[57] ABSTRACT

A method and system for preventing fraudulent use in a cellular system whereby upon establishment of communication with said micro cellular system, a maintenance console transmits an identifier to the control unit of said micro cellular system. The control unit compares the transmitted identifier to a stored value and controls the operation of the micro cellular system based upon said comparison. Operations of the micro cellular system are terminated if said transmitted value does not match said stored value and maintained if a match is found. The control unit additionally includes a time limit timer which is set upon activation of the control unit and is adapted to be reset upon command from the maintenance console, which command accompanies each communication for which access is maintained. Operation of the micro cellular system is terminated when said time limit expires without resetting.

14 Claims, 3 Drawing Sheets

SYSTEM FOR PREVENTING UNAUTHORIZED USE OF A MICRO CELLULAR SYSTEM OPERATING IN COEXISTENCE WITH A CELLULAR SYSTEM

FIELD OF THE INVENTION

The invention relates generally to micro cellular communications systems and more specifically to a method of preventing fraudulent use of a micro cellular system without control by a system controller.

BACKGROUND OF THE INVENTION

Micro cellular systems (MCS's) in the past have been broadly divided into two types of systems. A first type of system is one in which the transmission output from a wireless machine in a base station is reduced, thereby trying to reduce the cell radius in the cellular mobile telephone system (CMTS). This system has been implemented with the main purpose of increasing the repetition utilization efficiency of a frequency and thus of increasing the number of mobile units which can be accommodated per unit area. This system is essentially not different from the CMTS at all except that the cell radius is smaller. The frequency band used in the MCS is the same as in the CMTS and an operator of the CMTS controls and operates this system. An example of the system configuration is shown in FIG. 3.

In FIG. 3, the base station for the CMTS 101 and the base station for the MCS 102 are directly connected to the cellular switching station, or mobile telephone switching office, 103 and the control and operation of each base station, both 101 and 102, are carried out by the cellular switching station 103 in a centralized manner. Therefore, countermeasures against fraudulent use of the base stations 101 and 102 are carried out through the cellular switching station 103 and are the responsibility of an operator of the cellular switching station.

The second type of commonly used MCS is one which provides a special mobile communication service by using a frequency band which is different from that for the CMTS and has a system configuration of a miniaturized CMTS with a certain limited area as a service zone. For example, a system called a wireless PBX is a typical example of such a system configuration, as illustrated in FIG. 4. The FIG. 4 system generally uses legally defined minute transmission power, thereby making it unnecessary for a specific operator to control and operate it. A user purchases an entire system and controls and operates the system as its own private facility.

In FIG. 4, component 201 is an on-premise switching unit which is connected to a public telephone communications network, 202 is a control unit which is connected to the on-premise switching unit, 203 denotes a plurality of base stations which are connected to the control unit by wires, 204 is a mobile station which communicates by wireless connection to base station 203, and 205 is a wireless zone constituted with a plurality of base stations 203. Each of the constituting equipment and devices shown in FIG. 4 are generally small in size and light is weight, and can be easily moved and installed. Countermeasures against fraudulent use of these equipment devices are taken by each user by independent method.

In recent years, an MCS has been introduced which does not belong to either of the above-mentioned standard MCS systems. While this system utilizes the same frequency band as the CMTS, it is an independent MCS, like a wireless PBX, which avoids mutual interference with the CMTS, and therefore its system configuration is similar to that shown in FIG. 4. While an MCS of this type is installed in each user site and the ownership of the system, including the daily control and operation is carried out by the user, nonetheless the CMTS frequency band is used and a cellular operator must be responsible for the control and operation of the frequencies. An MCS of this type is small and lightweight and can, therefore, be easily moved and installed, a user can move an MCS from its initial location to another location in accordance with their needs and convenience. The disadvantage of such portability is that, unless necessary procedures for the co-existence of the MCS and CMTS are carried out properly at the new location to which the MCS has been moved, there is a possibility that the MCS will interfere with and hinder the CMTS. Of particular concern is the case in which the location to which the MCS is moved is a territory of a different cellular operator, such that a wireless facility can be operated at the new location, yet the cellular operator does not recognize and cannot control the facility's access, giving rise to serious concerns of responsibility.

It is therefore an objective of the invention to solve these conventional problems by providing a method and system for the prevention of fraudulent use by which to prevent an MCS using the same frequency band as a CMTS from being moved from its installation location to another location without permission.

SUMMARY OF THE INVENTION

These and other objectives of the invention are realized by the present invention which relates to a system and method for the prevention of fraudulent use of a micro cellular system using a frequency band in common with a cellular system. The micro cellular system is characterized in that is consists of a control unit connected to a telephone port to which a subscriber telephone number is allotted in a public telephone communication network. The control unit performs operations, connection and interruption of the MCS which is associated with a CMTS, the CMTS having common frequency bands and being adapted to communicate with the control unit from a maintenance console at a remote location through the public telephone communication network. Further, the above-mentioned control unit has a time limit timer which may be set from the above-mentioned maintenance console, the maintenance console having a function to reset/restart the above-mentioned timer. When the time limit timer of the control unit is timed out without resetting or restarting, the operation of the MCS is stopped.

Upon initialization of the MCS, the control unit resets/ restarts its time limit timer at the same time as starting operation of the MCS. The maintenance console accesses the control unit at an interval which is shorter than the above-mentioned time limit timer time, and resets/restarts the time limit timer if the access has been successfully attained, and thereby allows the operation of the MCS to continue. If access is not successful, the above-mentioned time limit timer is not reset, and when the time-out is reached, the control unit stops the operation of the MCS. In addition, a warning signal is sent to a system controller of the cellular system by the maintenance console if access has not been successfully attained.

Therefore, even if one tries to move an MCS from its own location of installation without permission and tries to use it without approval of the system controller, access from a maintenance console cannot be made and operation of the MCS is prohibited. In addition, a system controller can be notified quickly of any occurrence of an abnormal operation with respect to an MCS.

BRIEF DESCRIPTION OF THE DRAWINGS

The invention will hereinafter be described with reference to the attached drawings wherein.

DETAILED DESCRIPTION OF THE PREFERRED EMBODIMENT

Figure 1:
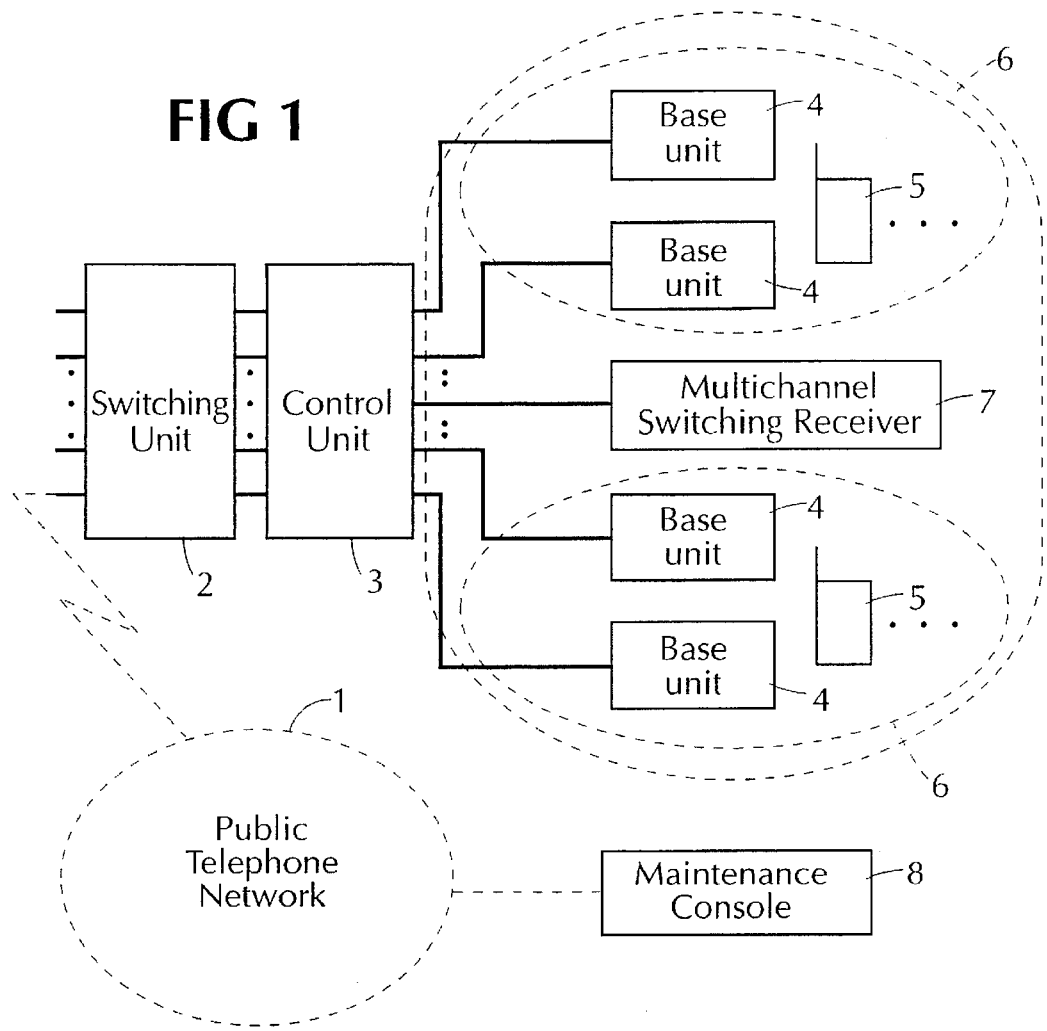
FIG. 1 illustrates a micro cellular system in accordance with the present invention.
Figure 4:
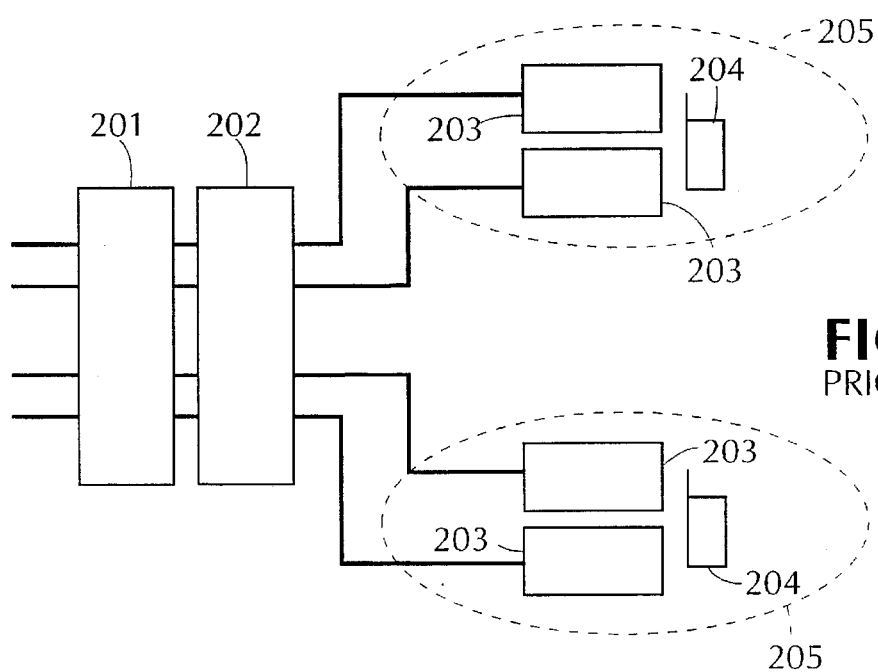
FIG. 4 illustrates a wireless PBX micro cellular system.

FIG. 1 illustrates a constitution of a micro cellular system (MCS) in accordance with the present invention. In FIG. 1, the MCS is equipped with an on-premise switching unit 2 which is connected to a public telephone communication network, a control unit 3, connected to the on-premise switching unit, which control unit has a modem function and can perform the continuation of an operation of the system or interruption thereof, a plurality of base stations 4 which are connected by wire to the control unit, and mobile stations 5 adapted for wireless connection to the base station. One wireless zone, 6, is constituted with a plurality of base stations 4 and a mobile station 5 which is registered in the wireless zone essentially for communication only in that wireless zone. In the case of a multi-channel receiver 7, it is possible to communicate over a plurality of wireless zones 6. In accordance with the present invention, a maintenance console 8 is connected to a public telephone communication network 1, and a telephone port to which a subscription telephone number of the public telephone communication network 1 is allotted is connected to a subscriber telephone port of the control unit 3 through the on-premise switching unit 2. By this arrangement, the maintenance console may make access to the control unit 3 from a remote location through the public telephone communication network.

In the MCS operated in accordance with the present invention, prevention of any fraudulent use is based upon the idea that the MCS is to be used at a location approved by the cellular operator and may not be moved or installed without approval or permission thereof.

Figure 2:
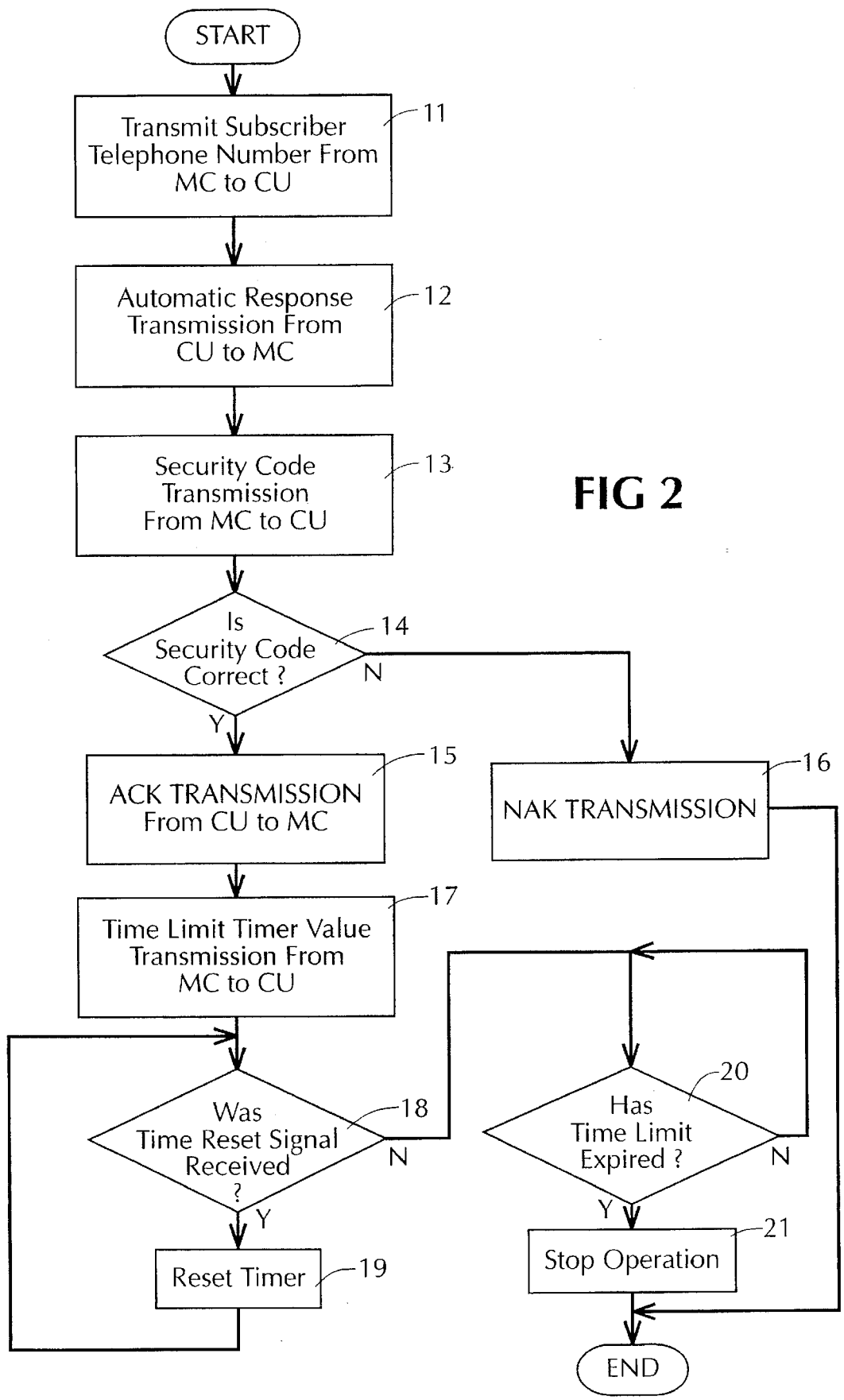
FIG. 2 provides a flow chart of a representative process flow for the present inventive method.
Figure 3:
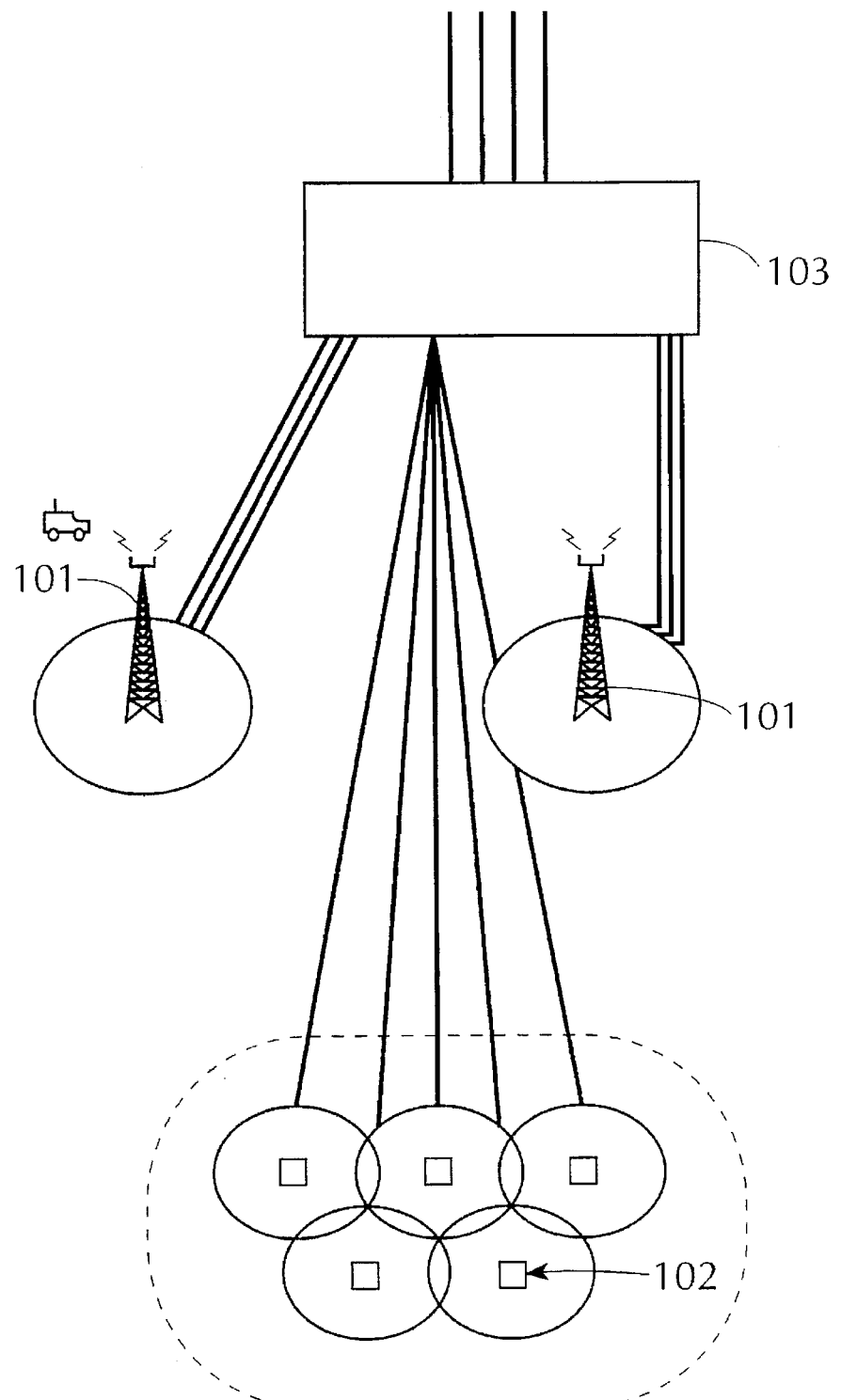
FIG. 3 provides an illustration of a micro cellular system which operates as an additional station of the broader cellular system and uses the same frequency band as the cellular system.

With reference to FIG. 2, the method of the present invention is detailed whereby the maintenance console 8 communicates with the control unit 3 on a regular basis. Within the MCS, a telephone port, to which a subscriber telephone number of the public telephone communication network is allotted in advance, is connected to a subscriber telephone port owned by the control unit 3 so that the control unit 3 may communicate with the maintenance console 8. The control unit has, by way of example, 64 circuits of subscriber telephone ports and each of the ports may be used as a connection port to the maintenance console. However, at the time of system installation, a connection port with the maintenance console is registered with the data base of the control unit. Each time the MCS is operated, a cellular operator instructs the maintenance console to start the system operation. The maintenance console 8 dials a subscriber telephone number of the control unit 3, registered in advance in the maintenance console 8, in order to start communication with the control unit when the system operation is instructed, at Step 11. When control unit detects reception of a signal from a connection port associated with the maintenance console 8, the control unit automatically responds, establishes a modem link at Step 12, and carries out data communication with the maintenance console. Once the maintenance console confirms a response from the control unit, it transmits a security code at Step 13. The security code may be comprised of password and an ID code which is unique to the system. The control unit compares the security code transmitted from the maintenance console at Step 14, to a control value and, if correct, transmits an acknowledge signal (ACK) to the maintenance console at Step 15. If the security code is not correct, the control unit returns a non-acknowledge signal (NAK) to the maintenance console, at Step 16, and communication is terminated.

As a result of the above, in the case in which ACK is received by the maintenance console 8, the control unit 8 is given an instruction for the continuation of the operations of the system and is notified of the time (value of the time limit timer) before starting the next communication (Step 17). In addition, in a case in which the maintenance console 8 receives NAK, the communication is terminated.

In a case in which a communication cannot be established with the above-mentioned control unit 3, the maintenance console 8 sounds an alarm and notifies a system controller to that effect.

Even after the operations of an MCS have started, the maintenance console 8 communicates with the control unit 3 on a regular basis, and instructs the continuation of the system operations (timer reset demand). The maintenance console 8 carries out the next communication with an interval shorter than the time limit timer notified to the control unit 3. When the control unit 3 receives a timer reset demand from the maintenance console 8 (Step 18), the control unit 3 resets the time limit timer (Step 19). If the control unit 3 cannot receive the timer reset demand from the maintenance console 8 (Step 18), it stops the operations of the MCS (Step 21) when the time limit timer reaches the time-out (Step 20).

The maintenance console 8 may alter the time limit timer value with respect to the control unit 3. In the case in which there is a demand for alteration of the time limit timer from the maintenance console 8, the control unit 3 changes the timer value. It is to be noted that the control unit 3 does not perform resetting of a timer by the on/off condition of the power source.

As can be clearly seen from the above-detailed example, with the present invention, in MCS's which utilize frequency bands in common with a cellular system, wherein a control unit is connected at a telephone port to which a subscriber telephone number is allotted in a public telephone communication network, which control unit performs operations, connection and interruption in the micro cellular system and has a time limit timer which can be set from a remote maintenance console, and wherein a maintenance console located at a remote location communicates through the public telephone communication network and has a function to reset/restart the control unit's time limit timer, that fraudulent use at a location other than tile location specified by the controller of the MCS can be prevented whereby upon expiration, or timing out, of the above-mentioned time limit timer, operation of the system is stopped.

The invention has been described with specific reference to a preferred embodiment, however, modifications can be made to the components and process flow without departing from the spirit and scope of the invention as found in the appended claims.

What is claimed is:

1. A micro cellular communication system authorized to operate on communication frequencies independently allocated by a control unit of said micro cellular system from a frequency band shared with a cellular system, said cellular system transmitting an identifier to said micro cellular system and periodically transmitting a timer reset signal thereto, comprising:

a control unit for receiving and comparing said transmitted identifier to a value stored in said micro cellular system and for permitting said micro cellular system to operate only if there is a match; and timer means associated with said control unit for permitting said micro cellular system to operate only so long as said periodic timer reset signal is received prior to a predetermined time limit being reached.

2. The micro cellular system of claim 1 further comprising modem means for connection to and communication along a public telephone network between said micro cellular system and said cellular system and for receiving said identifier value from said cellular system.

3. The micro cellular system of claim 1 wherein said control unit further comprises means for transmitting an acknowledgment signal to said cellular system when said received identifier value matches said stored identifier value.

4. The micro cellular system of claim 1 wherein said control unit further comprises means for transmitting a non-acknowledgment signal to said cellular system when said received identifier value does not match said stored identifier value.

5. A system for permitting authorized operation of a micro cellular system on communication frequencies independently allocated by a control unit of said micro cellular system from a frequency band shared with a cellular system, comprising:

a maintenance console which transmits an identifier to said micro cellular system and periodically transmits a timer reset signal thereto, said control unit receiving and comparing said transmitted identifier to a value stored in said micro cellular system and permitting said micro cellular system to operate only if there is a match;

timer means associated with said control unit for permitting said micro cellular system to operate only so long as said timer means receives said timer reset signal prior to a predetermined time limit being reached.

6. The system of claim 5 wherein said timer reset means is further adapted to transmit timer reset commands periodically for maintaining operation of said micro cellular system.

7. The system of claim 5 wherein said timer reset means is adapted to transmit a timer reset command in response to receipt of an acknowledgment signal from said micro cellular system indicating that said identifier and said stored value match.

8. A method for permitting authorized operation of a micro cellular system (MCS) on communication frequencies independently allocated by a control unit of said MCS from a frequency band shared with a cellular telephone communication system (CTCS), and preventing unauthorized operation of said micro cellular system, said micro cellular system including a timer having a time limit, comprising the steps of:

establishing a connection between said micro cellular system and said cellular system;

transmitting an identifier from said cellular system to said micro cellular system;

comparing said identifier to a value stored in said micro cellular system;

permitting said micro cellular system to operate only if said identifier and said stored value match;

activating said timer if operation is permitted;

resetting said timer in response to each receipt of a reset signal periodically transmitted from said cellular system; and permitting said micro cellular system to operate so long as said time limit has not been reached.

9. The method of claim 8 further comprising the step of sending, from said micro cellular system, a non-acknowledgment signal to said cellular system if said identifier and said stored value do not match.

10. The method of claim 8 further comprising the step of preventing said micro cellular system from operating when said time limit is reached prior to receipt of said reset signal from said cellular system.

11. The method of claim 8 further comprising the step of altering said time limit in response to commands from said cellular system.

12. The method of claim 8 further comprising the step of sending, from said micro cellular system, an acknowledgment signal to said cellular system if said identifier and said stored value match.

13. The method of claim 12 further comprising preventing said micro cellular system from further operating unless said acknowledgment signal is received within a predetermined time period.

14. The method of claim 13 wherein said cellular system periodically transmits a signal to maintain operation of said micro cellular system.

* * * * *